United States Patent [19]

Sherk et al.

[11] 3,923,530

[45] Dec. 2, 1975

[54] DIELECTRIC GLASS COMPOSITION

[75] Inventors: Thomas A. Sherk, West Hurley; Rao R. Tummala, Wappingers Falls, both of N.Y.

[73] Assignee: International Business Machines Corporation, Armonk, N.Y.

[22] Filed: June 27, 1973

[21] Appl. No.: 374,189

[52] U.S. Cl. ..................... 106/53; 106/49
[51] Int. Cl.² .... C03C 3/10; C03C 3/04; C03C 3/30
[58] Field of Search ............... 106/53, 49; 252/63.5

[56] References Cited
UNITED STATES PATENTS

| | | | |
|---|---|---|---|
| 2,210,489 | 8/1940 | Lemmens et al. | 106/53 |
| 2,643,020 | 6/1953 | Dalton | 106/53 |
| 3,238,151 | 3/1966 | Kim | 106/53 |
| 3,775,999 | 12/1973 | Foster et al. | 65/50 |

FOREIGN PATENTS OR APPLICATIONS

| | | | |
|---|---|---|---|
| 1,136,914 | 5/1957 | France | 106/53 |
| 1,055,770 | 4/1959 | Germany | 106/53 |

*Primary Examiner*—L. Dewayne Rutledge
*Assistant Examiner*—Mark Bell
*Attorney, Agent, or Firm*—Edward S. Gershuny

[57] ABSTRACT

A family of dielectric glasses having properties such that, when heat is applied to seal the dielectric glasses, there is no crazing in a MgO overcoat. These dielectric glasses have such viscosity properties as not to craze a MgO overcoat in the range 455 to 505°C corresponding to log viscosity of 10.3 poises and yet fire into good dielectric films at about 600°C. The glass has substantially the following constituents:

| | % by weight |
|---|---|
| PbO | 62.4 – 69.6 |
| $SiO_2$ | 5.8 – 13.6 |
| $B_2O_3$ | 13.6 – 20 |
| $Al_2O_3$ | 0.2 – 1.0 |
| MgO | 0 – 5 |
| CaO | 0 – 6 |

7 Claims, No Drawings

DIELECTRIC GLASS COMPOSITION

BACKGROUND OF THE INVENTION

This invention relates to a composition of dielectric glasses. More particularly, the invention relates to novel glasses which are particularly suited for use in the manufacture of gas panel displays.

Plates used in manufacturing a gas display panel contain a dielectric layer with a magnesium oxide overcoat. In the prior art, during the step of sealing plates together, the magnesium oxide overcoat layer has a tendency to craze (develop small cracks). This is, of course, undesirable.

It is therefore a primary objective of this invention to provide a dielectric glass having properties such that a magnesium overcoat layer will not craze when panels are sealed together. More particularly, it is an object of the invention to provide a dielectric glass having such properties that the crazing temperature will be higher than the temperature used for sealing panels together.

Additional objects of the invention are to provide a dielectric glass having the following properties:
a steep viscosity-temperature curve such that the dielectric is capable of being fired at a temperature below the incipient fusion temperature of the glass substrate;
a thermal co-efficient of expansion (TCE) which closely matches that of the substrate;
capable of being flowed easily into bubble free films with little or no tendency to crystallize; and
good chemical durability.

SUMMARY OF THE INVENTION

The above and other objects are achieved in accordance with the invention by providing a dielectric glass composed substantially of the following constituents:

|  | % by weight |
| --- | --- |
| PbO | 62.4 – 69.6 |
| $SiO_2$ | 5.8 – 13.6 |
| $B_2O_3$ | 13.6 – 20 |
| $Al_2O_3$ | 0.2 – 1.0 |
| MgO | 0 – 5 |
| CaO | 0 – 6 |

When the dielectric glass of this invention is used in the process of manufacturing a gas display panel, the glass substrate upon which it is deposited is typically a soda-lime-silica float glass having a thermal co-efficient of expansion (TCE) of approximately $92 \times 10^{-7}$ per °C to the set point of the dielectric (approximately 440°C). Therefore, the dielectric glass should preferably have a TCE of approximately 90–94 to its set point. This corresponds to a TCE of approximately 80–84 in the temperature range from room temperature (approximately 22°C) to 300°C. Glasses which are particularly suitable for use in this process consist of substantially the following constituents:

|  | % by weight |
| --- | --- |
| PbO | 62.4 – 66.0 |
| $SiO_2$ | 11.0 – 13.0 |
| $B_2O_3$ | 16.0 – 18.4 |
| $Al_2O_3$ | 0.2 |
| MgO | 2.2 – 3.0 |
| CaO | 2.2 – 5.4 |

The primary advantage of this invention is that, when using the dielectric glasses described herein, a magnesium oxide overcoat layer will not craze unless it is subjected to a relatively high temperature. This is of particular advantage in vitreous sealing technology. Referring particularly to glasses whose constituents are within the preferred ranges described above, the crazing temperature (485°C and above) is higher than the temperature normally used to seal glass plates together (around 470°–480°C) using vitreous sealing glasses during the process of manufacturing a gas display panel.

Additionally, each of the glasses described herein also exhibits one or more of the following desirable properties:
it can be fired below the incipient fusion temperature of the substrate;
its TCE is fairly close to that of the substrate;
it flows easily into a smooth bubble free film with little or no tendency to crystallize; and
it has good chemical durability.

The foregoing and other objects, features and advantages of the invention will be apparent from the following more particular description of preferred embodiments thereof.

DETAILED DESCRIPTION

All of the glasses described herein contain constituents within the ranges shown in the following table. Also, for each of the glasses described herein, between 3 per cent and 8.4 per cent of the glass composition is calcium oxide, magnesium oxide or both.

|  | % by weight |
| --- | --- |
| PbO | 62.4 – 69.6 |
| $SiO_2$ | 5.8 – 13.6 |
| $B_2O_3$ | 13.6 – 20 |
| $Al_2O_3$ | 0.2 – 1.0 |
| MgO | 0 – 5 |
| CaO | 0 – 6 |

EXAMPLES I–IV

Examples I–IV are four dielectric glass compositions which are particularly suitable for use in fabricating gas display panels, especially when using a glass substrate which has a TCE equal to 82. (When thermal co-efficients of expansion are given herein, they are expressed in units multiplied by $10^{-7}$/°C and refer to the temperature range from room temperature to 300°C.)

|  | Per Cent By Weight | | | |
| --- | --- | --- | --- | --- |
|  | I | II | III | IV |
| PbO | 66 | 64.4 | 63.4 | 62.4 |
| $SiO_2$ | 11 | 12 | 12 | 13 |
| $B_2O_3$ | 18.4 | 17 | 17 | 16 |
| $Al_2O_3$ | 0.2 | 0.2 | 0.2 | 0.2 |
| MgO | 2.2 | 3 | 3 | 3 |
| CaO | 2.2 | 3.4 | 4.4 | 5.4 |
| TCE(RT-300) | 82 | 82–7 | 83 | 83 |
| TCraze | 485 | 496 | 497 | 505 |

It will be noted that the glass compositions of example I–IV all exhibit a TCE which is quite compatible to that of the glass substrate. It is also of great importance that, when using these glasses, the temperature at which crazing will occur in the magnesium oxide overcoat is between 485° and 505°C. This is far enough above the temperatures normally used in sealing glass panels together (470°–480°C) so that no crazing will occur during the manufacturing process.

The four preferred glasses all contain constituents within the following ranges.

|  | % by weight |
|---|---|
| PbO | 62.4 – 66.0 |
| $SiO_2$ | 11.0 – 13.0 |
| $B_2O_3$ | 16.0 – 18.4 |
| $Al_2O_3$ | 0.2 |
| MgO | 2.2 – 3.0 |
| CaO | 2.2 – 5.4 |

EXAMPLES V–VII

Examples V–VIII are three additional dielectric glasses which offer various advantages.

|  | Per Cent By Weight | | |
|---|---|---|---|
|  | V | VI | VII |
| PbO | 66.6 | 68.6 | 68.6 |
| $SiO_2$ | 13.6 | 13.6 | 13.6 |
| $B_2O_3$ | 13.6 | 13.6 | 13.6 |
| $Al_2O_3$ | 0.2 | 0.2 | 0.2 |
| MgO | 0.0 | 4.0 | 0.0 |
| CaO | 6.0 | 0.0 | 4.0 |
| TCE(RT-300) | 86 | 81.6 | 84.8 |
| TCraze | 482 | 472 | 470 |

The glasses of examples V–VIII are somewhat less desirable than examples I–IV for use in the preferred process of manufacturing gas panel displays because TCE is too high (example V), the crazing temperature is too close to the temperature used for sealing (example VI) or both (example VII). However, examples V–VII could be of substantial value in processes where the substrate has a higher thermal co-efficient of expansion or wherein the coated substrate will not be subjected to temperatures as high as approximately 470°C. Examples I–VII comprise a class of dielectric glasses constituted substantially as follows.

|  | % by weight |
|---|---|
| PbO | 62.4 – 68.6 |
| $SiO_2$ | 11.0 – 13.6 |
| $B_2O_3$ | 13.6 – 18.4 |
| $Al_2O_3$ | 0.2 – 1.0 |
| MgO | 0.0 – 4.0 |
| CaO | 0.0 – 6.0 |

EXAMPLES VIII–X

Examples VIII–X all have crazing temperatures below the temperature of 470°C which is used in sealing gas panel displays. However, these glasses could be of substantial value in a manufacturing process wherein their crazing temperatures are not exceeded. It should also be noted that, for example X, the TCE is above the preferred range described above. However, this glass composition could well be used on a substrate having a slightly higher TCE than the substrate referred to above.

|  | Per Cent By Weight | | |
|---|---|---|---|
|  | VIII | IX | X |
| PbO | 69.6 | 69.0 | 69.0 |
| $SiO_2$ | 13.6 | 7.8 | 5.8 |
| $B_2O_3$ | 13.6 | 20.0 | 20.0 |
| $Al_2O_3$ | 0.2 | 0.2 | 0.2 |
| MgO | 3.0 | 3.0 | 5.0 |
| CaO | 0.0 | 0.0 | 0.0 |
| TCE(RT-300) | 82.2 | 82.6 | 85 |
| TCraze | 465 | 460 | 455 |

Although some of the examples of dielectric glass described above are not completely suitable for use in a manufacturing process which utilizes a glass substrate having a thermal co-efficient of expansion of approximately 82 (in the temperature range from room temperature to 300°C) and wherein the coated substrate, including a magnesium oxide overcoat layer, will be subjected to sealing temperatures of approximately 470°–480°C, those skilled in the art will recognize that each of these glasses will be of substantial value in processes wherein these latter two parameters fall within other ranges. All of the examples of dielectric glass described herein have constituents which fall within the following ranges.

|  | % by weight |
|---|---|
| PbO | 62.4 – 69.6 |
| $SiO_2$ | 5.8 – 13.6 |
| $B_2O_3$ | 13.6 – 20.0 |
| $Al_2O_3$ | 0.2 – 1.0 |
| MgO | 0.0 – 5.0 |
| CaO | 0.0 – 6.0 |

ADDITIONAL CONSIDERATIONS

All of the above examples of dielectric glasses include 0.2% by weight $Al_2O_3$. Glasses with little or no $Al_2O_3$ flow best when fired in exceedingly oxidizing wet atmospheres. $Al_2O_3$ in the range of 0.2–1.0% by weight tends to stabilize the glasses and eliminate crystallization problems. Glasses having an amount of $Al_2O_3$ much higher than 1% do not respond to wet firing and will therefore require higher firing temperatures. Those skilled in the art will recognize that this parameter can be varied to some extent with 0.2% being a preferred optimum.

Although glasses which have a high $SiO_2$ content (for example, 15% or more) have higher crazing temperatures, they cannot be conveniently flowed into smooth bubble free dielectric films due to their shallow viscosity-temperature relationship. For a given crazing temperature, a glass with a higher $B_2O_3$ content than $SiO_2$ can be flowed more easily in oxidizing atmospheres (in all of the examples given above the $B_2O_3$ content is equal to or higher than the $SiO_2$ content). However, prior art glasses that are high in $B_2O_3$ content typically have low crazing temperatures and low chemical durabilities.

As shown in this invention the MgO-crazing temperature in high $B_2O_3$ glasses can be increased by incorporating MgO, CaO or (preferably) both into the glass composition. These glasses can be fired into smooth bubble free films because they have a steep viscosity-temperature relationship.

The use of more than about 3–4% of MgO in the glass composition will tend to result in a dielectric film which tends to crystallize and which has a relatively high TCE. Both of these properties, particularly the former, will generally be undesirable. Adding only CaO (that is, without MgO) to the dielectric glass composition, in amounts up to approximately 6%, can significantly improve (raise) the crazing temperature but will generally result in high TCE (compare examples V and VII). The best results, considering crazing temperature, TCE and ability to be fired into smooth bubble free films as the most important parameters, are obtained by adding combinations of MgO and CaO to the other constituents of the dielectric glass (note examples I–IV).

While the invention has been particularly shown and described with reference to preferred embodiments thereof, it will be understood by those skilled in the art that the above and other changes in form and details may be made therein without departing from the spirit and scope of the invention.

What is claimed is:

1. A dielectric glass having a thermal coefficient of expansion (from room temperature to 300°C) in the range of approximately $81.6$–$86.0 \times 10^{-7}$ per °C and a crazing temperature with respect to a magnesium oxide overcoat in the range of approximately 455° – 505°C, consisting essentially of the following ingredients in the following proportions:

hc,22 Percent by weight

| Lead oxide | (PbO) | 62.4 – 69.6 |
|---|---|---|
| Boric oxide | ($B_2O_3$) | 13.6 – 20.0 |
| Silicon oxide | ($SiO_2$) | 5.8 – 13.6 |
| Alumina | ($Al_2O_3$) | 0.2 – 1.0 |
| Calcium oxide | (CaO) | 0.0 – 6.0 |
| Magnesium | (MgO) | 0.0 – 5.0 | and wherein the total amount of CaO plus MgO is 3.0 – 8.4 percent by weight.

2. The dielectric glass of claim 1 wherein there is 62.4 – 66.6 percent by weight PbO, 13.6 – 18.4 percent by weight $B_2O_3$, 11.0 – 13.6 percent by weight $SiO_2$ and 0.0 – 3.0 percent by weight MgO.

3. A dielectric glass having a thermal coefficient of expansion (from room temperature to 300°C) in the range of approximately $82 - 83 \times 10^{-7}$ per °C and a crazing temperature with respect to a magnesium oxide overcoat in the range of approximately 485° – 505°C, consisting essentially of the following ingredients in the following proportions:

| | | Percent by weight |
|---|---|---|
| Lead oxide | (PbO) | 62.4 – 66.0 |
| Boric oxide | ($B_2O_3$) | 16.0 – 18.4 |
| Silicon oxide | ($SiO_2$) | 11.0 – 13.0 |
| Alumina | ($Al_2O_3$) | 0.2 |
| Calcium oxide | (CaO) | 2.2 – 5.4 |
| Magnesium oxide | (MgO) | 2.2 – 3.0. |

4. A dielectric glass in accordance with claim 3 consisting essentially of:
66.0 percent PbO, 18.4 percent $B_2O_3$, 11.0 percent $SiO_2$, 0.2 percent $Al_2O_3$, 2.2 percent CaO and 2.2 percent MgO.

5. A dielectric glass in accordance with claim 3 consisting essentially of:
64.4 percent PbO, 17.0 percent $B_2O_3$, 12.0 percent $SiO_2$, 0.2 percent $Al_2O_3$, 3.4 percent CaO and 3.0 percent MgO.

6. A dielectric glass in accordance with claim 3 consisting essentially of:
63.4 percent PbO, 17.0 percent $B_2O_3$, 12.0 percent $SiO_2$, 0.2 percent $Al_2O_3$, 4.4 percent CaO and 3.0 percent MgO.

7. A dielectric glass in accordance with claim 3 consisting essentially of:
62.4 percent PbO, 16.0 percent $B_2O_3$, 13.0 percent $SiO_2$, 0.2 percent $Al_2O_3$, 5.4. percent CaO and 3.0 percent MgO.

* * * * *